US007296406B2

(12) United States Patent
Futa, Jr. et al.

(10) Patent No.: US 7,296,406 B2
(45) Date of Patent: Nov. 20, 2007

(54) SYSTEM FOR POSITIONING A PISTON INCLUDING A FAIL FIXED VALVE FOR HOLDING THE PISTON IN POSITION DURING A POWER INTERRUPTION AND METHOD OF USING SAME

(75) Inventors: Paul W. Futa, Jr., North Liberty, IN (US); George S. Wieger, Niles, MI (US); Steven A. Lewis, South Bend, IN (US); Gregory A. Lafferty, Plymouth, IN (US); John C. Van Oosterum, Mishawaka, IN (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 11/363,323

(22) Filed: Feb. 28, 2006

(65) Prior Publication Data

US 2007/0199314 A1 Aug. 30, 2007

(51) Int. Cl.
*F02C 9/00* (2006.01)
*F15B 20/00* (2006.01)

(52) U.S. Cl. .......................................... 60/403; 91/463

(58) Field of Classification Search ................. 60/399, 60/403, 406; 91/463
See application file for complete search history.

(56) References Cited

U.S. PATENT DOCUMENTS 4,276,809 A 7/1981 Kast
4,470,337 A 9/1984 Kast
4,608,820 A 9/1986 White et al.
4,718,229 A 1/1988 Riley
5,235,806 A 8/1993 Pickard
5,490,379 A 2/1996 Wernberg et al.
5,555,720 A 9/1996 Wernberg et al.
5,735,122 A 4/1998 Gibbons
5,784,884 A * 7/1998 Poerio et al. ................ 60/403
6,205,766 B1 3/2001 Dixon et al.
6,715,278 B2 4/2004 Demers
6,912,837 B2 7/2005 Demers
2005/0022498 A1 2/2005 Futa et al.

* cited by examiner

*Primary Examiner*—Thomas E. Lazo
(74) *Attorney, Agent, or Firm*—Ingrassia Fisher & Lorenz

(57) ABSTRACT

A controlled piston (20, 62, 102) having a first end (24, 64, 104) mounted in a controlled piston sleeve (22) and a spool (16) movably mounted in a spool sleeve (18), a first fluid passage (40, 66, 108) from the spool (16) to the controlled piston first end (24, 64, 104), the position of the spool (16) affecting a position of the controlled piston (20, 62, 102), an FFV (42, 68, 110) in an FFV sleeve (44, 70, 112) in the first fluid passage (40, 66, 108) having a first end section (46, 74, 116), a second end section (48, 78, 120) and a central section (50, 82, 126) having a third diameter less than the diameters of the first and second sections, the FFV (42, 68, 110) being shiftable between a first position blocking the first fluid passage (40, 66, 108) and a second position allowing fluid flow past the central section (50, 82, 126) to the controlled piston (20, 62, 102), and a second fluid passage (56, 88, 134) from the spool (16) to the FFV first end section (46, 74, 116). Shifting the spool (16) to a failsafe position shifts the FFV (42, 68, 110) to the first position to fix the controlled piston (20, 62, 102) in place.

16 Claims, 3 Drawing Sheets

SYSTEM FOR POSITIONING A PISTON INCLUDING A FAIL FIXED VALVE FOR HOLDING THE PISTON IN POSITION DURING A POWER INTERRUPTION AND METHOD OF USING SAME

FIELD OF THE INVENTION

The present invention is directed to a control system for controlling and maintaining the position of a piston and a method of using same, and, more specifically, toward a control system for controlling the position of a piston which system includes a fail-fixed valve (FFV) for holding the piston in position during a power interruption and a method of using same.

BACKGROUND OF THE INVENTION

The position of a piston, such as a valve or actuator body, may be affected by controlling the pressures of fluids applied to one or both ends thereof. These pressures may be controlled in turn by a device such as an electrohydraulic servovalve (EHSV) which uses a first stage motor to control the position of a second stage spool. Moving the spool opens and closes various fluid passages to control the pressure sources connected to the valve or actuator body. The present invention will be described herein in terms of a valve or actuator body that is positioned by the pressures of fuel in an aircraft fuel system, it being understood that it is not limited to use in such systems. The general term "piston" is used herein to describe a structure that could be either a valve, such as a fuel metering valve, or an actuator body, such as may be used for positioning variable geometry guide vanes (or moving other parts) on an aircraft.

The piston positioned by the control system may be a fuel metering valve, the position of which affects fuel flow to a gas turbine engine. Alternately, the piston may be connected to movable elements, such as variable geometry guide vanes, the position of which is controlled by the position of the piston. In the event of a power interruption to the control system, it may be desirable to maintain the piston in position until power is restored. However, when power is interrupted, system pressures drop and the fluid holding the piston in position may drain and allow the piston to deviate from the position it was in when the power interruption occurred. While it is known to shift an EHSV to a failsafe position in the event of a power interruption, EHSV second stage spools leak and cannot adequately prevent fluid flows or hold a piston in position.

This problem has been addressed by the inclusion of FFV's between the EHSV and the piston, but the control of these valves has heretofore been complicated. Furthermore, known FFV's sometimes allow the position of a piston to shift before finally coming to rest in a fixed position. It would therefore be desirable to provide a fuel system having a piston controlled by the position of a spool, such as a second stage spool of an EHSV, and an FFV for selectively fixing the piston in position which is simple in construction and in which, optionally, the position of the piston may be substantially maintained in the position it occupied at a power loss.

SUMMARY OF THE INVENTION

This problem and others are addressed by the present invention which comprises, in a first embodiment, a system that includes a controlled piston slidably mounted in a controlled piston sleeve that has a first end and a spool movably mounted in a spool sleeve. A first fluid passage extends from the spool to the controlled piston first end, and the position of the spool affects the fluid pressure applied to the controlled piston first end and a position of the controlled piston. An FFV in an FFV sleeve in the first fluid passage has a first end section with a first diameter, a second end section with a second diameter and a central section with a third diameter less than the first and second diameters. The FFV is shiftable between a first position blocking the first fluid passage and a second position allowing fluid flow past the central portion to the controlled piston. A second fluid passage extends from the spool to the FFV first end section. Shifting the spool to a failsafe position shifts the FFV to the FFV first position to seal a fixed volume of fluid between the FFV and the controlled piston first end.

Another aspect of the invention comprises a system that includes a controlled piston slidably mounted in a controlled piston sleeve and having a first end and a second end, and an EHSV having a second stage spool movably mounted in a spool sleeve. A first fluid passage extends from the spool to the controlled piston first end, and the fluid pressure in the first fluid passage affects a position of the controlled piston. The system also includes an FFV in an FFV sleeve in the first fluid passage, the FFV having a first end section having a first diameter, a second end section having a second diameter and a central section having a third diameter less than the first and second diameters. The FFV is shiftable between a first position blocking the first fluid passage and a second position allowing fluid flow past the central portion to the controlled piston. A second fluid passage extends from the spool to the FFV first end section, a third fluid passage extends from the spool to the controlled piston second end, and a fourth fluid passage from the spool to the FFV second end.

A further aspect of the invention comprises a method used in a system that includes a controlled piston slidably mounted in a controlled piston sleeve and having a first end, a spool movably mounted in a spool sleeve, a first fluid passage from the spool to the controlled piston first end, and an FFV in an FFV sleeve in the first fluid passage, the FFV having a first end section having a first diameter, a second end section having a second diameter and a central section having a third diameter less than the first and second diameters. The method includes shifting the spool to control fluid flow in the first fluid passage to control the position of the controlled piston, and, in the event of a power loss when the controlled piston is in a position, shifting the spool to a failsafe position, increasing a fluid flow in the first fluid passage to move the controlled piston from the position, and increasing a volume in the FFV sleeve to compensate for the increased fluid flow and return the controlled piston to the position and blocking the first fluid passage to maintain the controlled piston in the position.

BRIEF DESCRIPTION OF THE DRAWINGS

These and other aspects and features of the invention will be better understood after a reading and understanding of the below detailed description together with the following drawings wherein.

DETAILED DESCRIPTION

Figure 1:
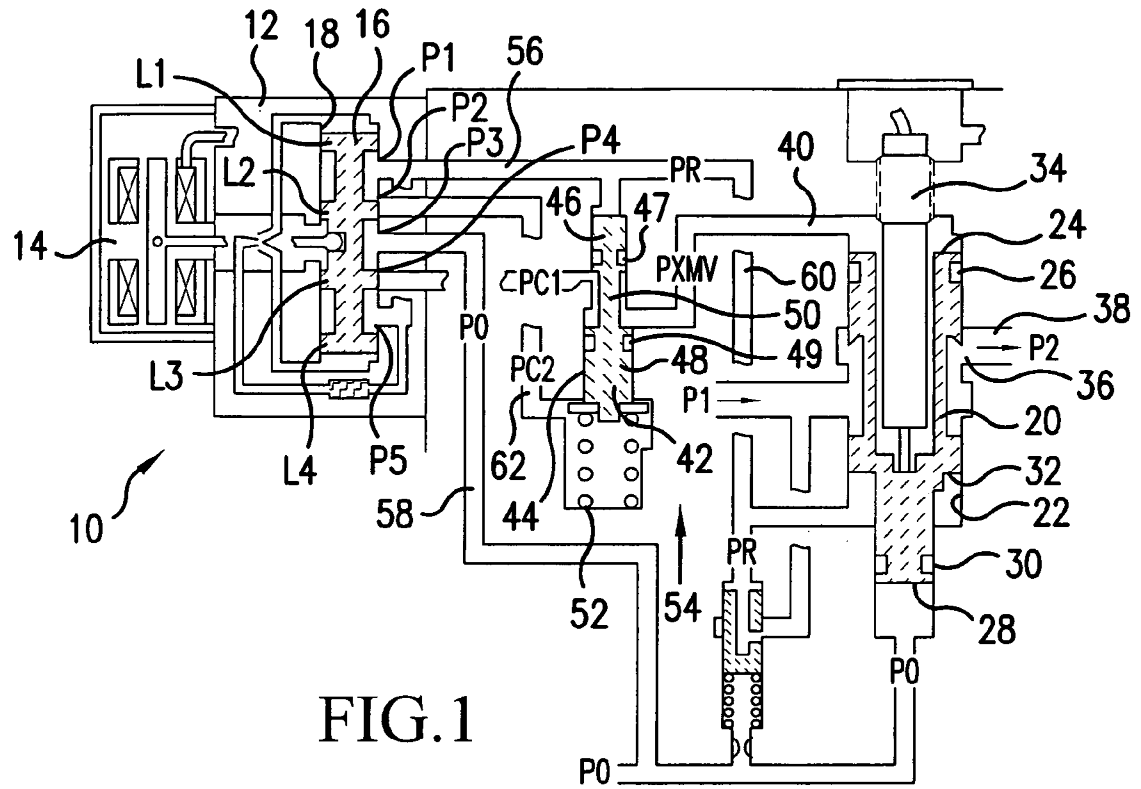
FIG. 1 schematically illustrates a first system for controlling the position of a piston that includes an FFV shown in an operating position.

Referring now to the drawings, wherein the showings are for the purpose of illustrating presently preferred embodiments of the invention only and not for the purpose of limiting same, FIG. 1 illustrates a control system 10 that includes a two-stage EHSV 12 comprising a first stage motor 14 and a second stage spool 16 slidably mounted in a spool sleeve 18. The position of the spool is controlled by the first stage motor in a well known manner. Spool sleeve 18 includes five ports, P1-P5, and spool 16 includes four lands, L1-L4, the positions of which with respect to the ports P1-P5 affect fluid flow though the EHSV 12 as discussed herein.

System 10 further includes a piston 20 mounted in a control valve sleeve 22 and including a first end 24, a first end seal 26, a second end 28, a second end seal 30 and an annular control surface 32. The combined areas of the second end 28 and the annular control surface 32 are approximately equal to the area of first end 24. A linear variable differential transducer (LVDT) 34 connected to piston 20 provides piston position information to a controller (not shown). In the present embodiment, piston 20 comprises a fuel metering valve, and the position of piston 20 controls the size of a fuel outlet 36 in fuel line 38. However, piston 20 in other embodiments may not be part of a valve, but rather may be used to affect the position of an actuator or other device connected thereto.

A first passage 40 extends from fourth port P4 to control valve sleeve 22 near first end 24 of control piston 20 and passes through an FFV 42 slidably mounted in an FFV sleeve 44. FFV 42 includes a first end section 46 having a first seal 47 and a first diameter, a second end section 48 having a second seal 49 and a second diameter greater than the first diameter, and a central section 50 having a third diameter less than the first and second diameters. A spring 52 biases FFV 42 in the direction of arrow 54, up as viewed in FIG. 1, toward an open position.

System 10 further comprises a second passage 56 connecting first port P1 to the first end section 46 of FFV 42, a third passage 58 connecting third port P3 to the second end of piston 20, a fourth passage 60 connecting second passage 56 to annular control surface 32 and a fifth passage 62 connecting second port P2 to second end section 48 of FFV 42. A first pressure P0 is supplied to third passage 58 and to third port P3. A second pressure PR, in this embodiment about 250 psi greater than P0, is supplied to ports P1 and P5 via fourth passage 60 and second passage 56.

In the normal operating mode of FIG. 1, the direction of arrow 54 being referred to as “up” for convenience, the combined upward pressures on second end 28 and on annular control surface 32 is somewhere between P0 and PR. Therefore exposing first end 24 of piston 20 to pressure PR will move piston 20 down and exposing first end 24 of piston 20 to pressure P0 will move piston 20 up. Third land L3 of spool 16 blocks passage 40 in steady-state operation. If piston 20 is to be moved upwardly to increase the size of opening 36, a controller causes spool 16 to move upwardly so that third land L3 partially uncovers fourth port P4 and allows fluid communication between fluid at pressure PR at fifth port P5 and first passage 40. Spool 16 is commanded to block fourth port P4 when the desired position of piston 20 is obtained. To move piston 20 upwardly as viewed in FIG. 1, spool 16 is moved downwardly to open first passage 40 to lower pressure P0 from third port P3. Spool 16 is again returned to a position in which third land L3 blocks third port P3 when a desired position of piston 20 is obtained.

Meanwhile, first end 46 of FFV 42 is exposed to second pressure PR and second end 48 of FFV 42 is exposed to a third pressure PC2 derived from second pressure PR. The upward force generated by third pressure PC2 and spring 52 holds FFV 42 in the open position illustrated in FIG. 1 during normal system operation.

Figure 2:
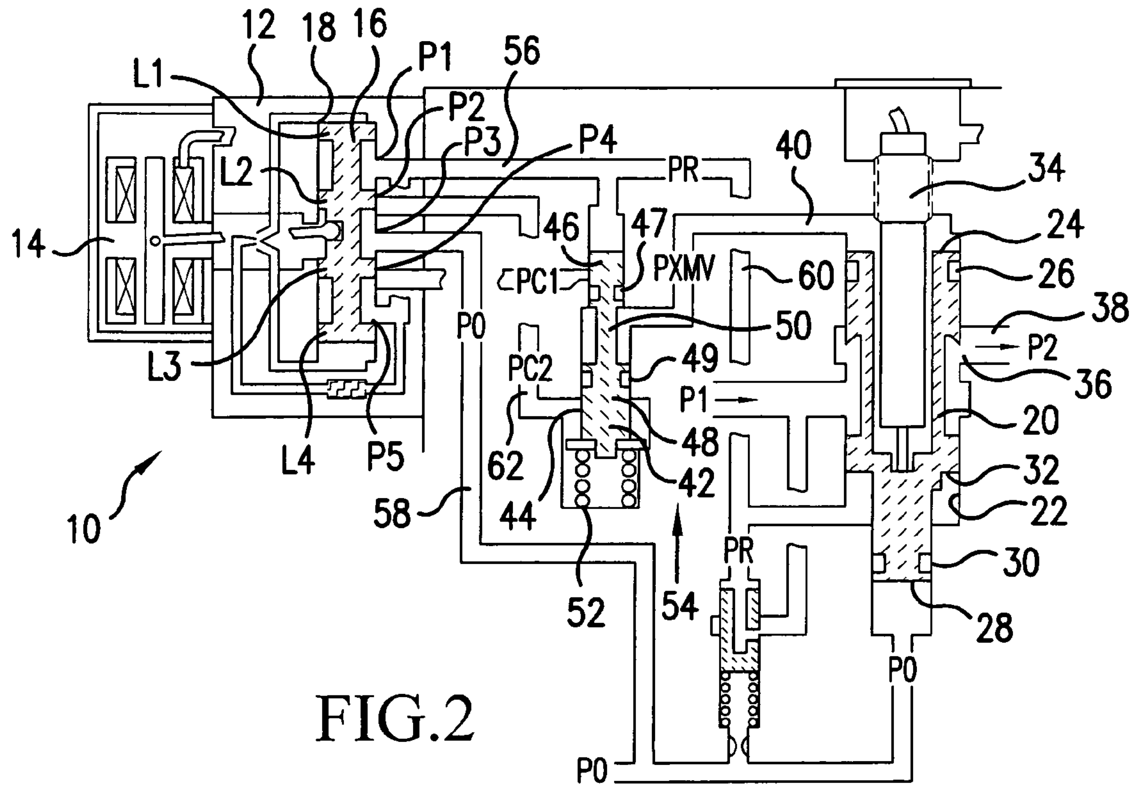
FIG. 2 schematically illustrates the system of FIG. 1 with the FFV in the fail fixed position.

In the event of a power loss or interruption, EHSV 12 is adapted to shift spool 16 to a failsafe position, to and against the upper end of spool sleeve 18 as illustrated in FIG. 2. In this position, second port P2 is opened to first pressure P0 which is lower than third pressure PC2, and this lower, first pressure is applied against second end 48 of FFV 42. First pressure PR continues to be applied against first end 46 of FFV 42, and this greater pressure drives FFV 42 in the direction opposite arrow 54 in FIG. 1, or downwardly as viewed in this figure. In this closed, or fail fixed position, FFV 42 seals first passage 40 between FFV 42 and piston 20 with first and second seals 47, 49 and the first end seal 26 of piston 20. Since the fluid in first passage 40 between the FFV 42 and the piston 20 is incompressible, and fluid cannot leak from this portion of first passage 40, piston 20 is fixed in position. This position is substantially the same position as piston 20 was in when the power interruption occurred.

It will be noted from a comparison of FIGS. 1 and 2 that when spool 16 shifts from the position of FIG. 1 to the position of FIG. 2, fourth port P4 will briefly be exposed to first pressure PR for the amount of time required for FFV 42 to shift to a position blocking first passage 40. This higher pressure will move piston 20 downwardly as viewed in FIG. 1, away from the position it occupied when the power interruption occurred. However, it will be appreciated from these figures that, because the second section 48 of FFV 42 has a larger diameter that the first section 46 of the FFV 42, the corresponding second portion of FFV sleeve 44 has a larger volume than the portion of FFV sleeve 44 surrounding first portion 46. Thus, as FFV 42 shifts to the position illustrated in FIG. 2, the volume surrounding central portion 50 of FFV 42 increases. The relative sizes of the first and second FFV diameters and the stroke of FFV 42 are selected so that this increase in volume is sufficient to compensate for the transient flow increase caused by the shifting of spool 16 to the failsafe position. In this manner, although briefly displaced, piston 20 will return to substantially the same position it occupied at the power interruption when FFV 42 reaches the position illustrated in FIG. 2. When power to the system 10 is restored, spool 16 shifts to expose second end 48 of FFV 42 to third pressure PC2 derived from first pressure PR, which, together with the biasing force of spring 52, is sufficient to return FFV 42 to the position of FIG. 1 and allow for the normal, resumed operation of system 10.

Figure 3:
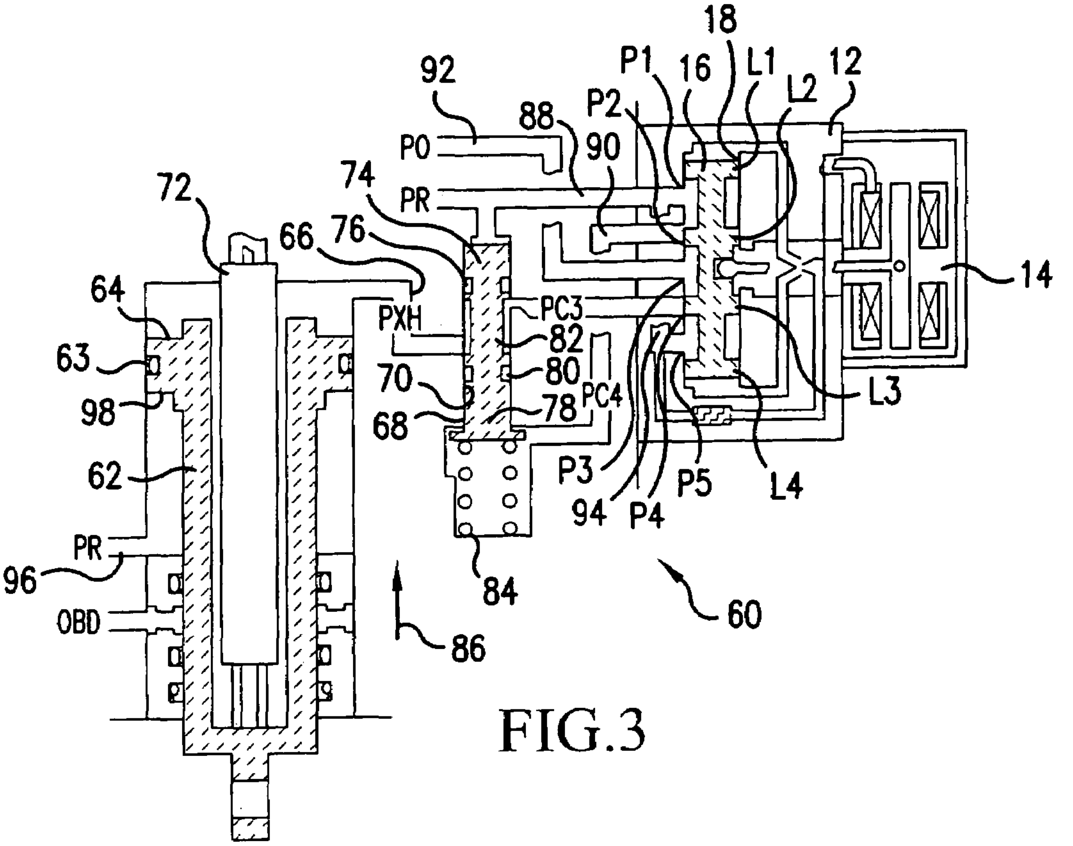
FIG. 3 schematically illustrates a second system for controlling the position of a piston that includes an FFV shown in an operating position.
Figure 4:
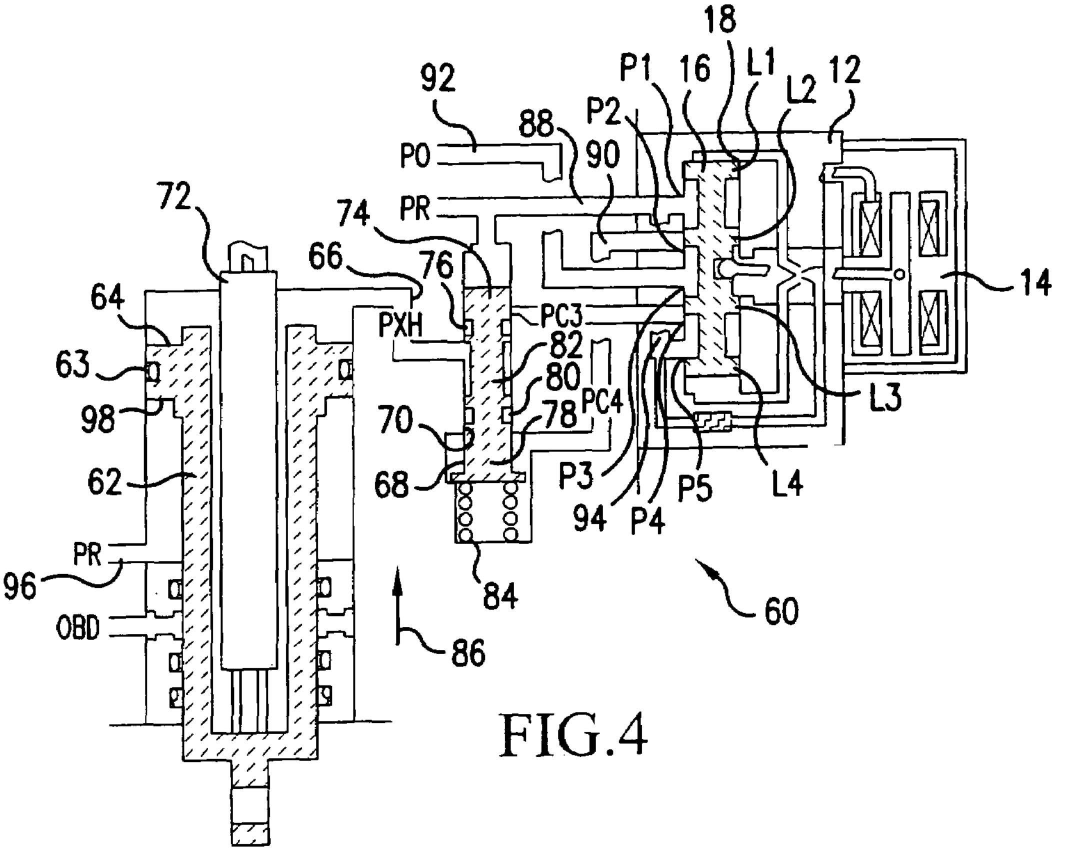
FIG. 4 schematically illustrates the system of FIG. 3 with the FFV in the fail fixed position.

A second embodiment of the invention is illustrated in FIGS. 3 and 4 wherein like reference numerals are used to identify elements common to the first embodiment. In addition to EHSV 12, system 60 of FIG. 3, includes a piston 62 having a first end 64, a first end seal 63, and an annular surface 98. A first passage 66 connects fourth port P4 of EHSV 12 to first end 64 of piston 62 via an FFV 68 slidably mounted in an FFV sleeve 70. An LVDT 72 provides position information of piston 62 to a controller (not shown). FFV 68 includes a first end section 74 having a first diameter and a first seal 76, a second end section 78 having a second diameter and a second seal 80, and a central section 82 having a third diameter less than the first and second diameters. A spring 84 biases FFV 68 in the direction of arrow 86, up as viewed in FIG. 3, toward an open position.

System 60 further comprises a second passage 88 connecting first port P1 to the first end section 74 of FFV 68, a third passage 90 connecting second port P2 of EHSV 12 to second end 78 of FFV 68, a fourth passage 92 connecting third port P3 of EHSV 12 to a source of fluid at first pressure P0, a fifth passage 94 connecting second passage 88, at second pressure PR, to fifth port P5 of EHSV 12 and a sixth passage 96 connecting a source of pressure PR to annular surface 98. Second passage 88 is maintained at pressure PR.

In operation, a unilateral load is applied to piston 62, such as by variable geometry guide vanes, and the position of piston 62 is controlled by controlling the pressure exerted on first end 64 of the piston 62. Increasing the pressure at first end 64 causes the piston 62 to move in the direction opposite arrow 86, or down as viewed in FIG. 4. When the pressure at first end 64 of piston 62 is decreased, the load attached to piston 62 and pressure PR in passage 96 move piston 62 in the direction of arrow 86. Spool 16 of EHSV 12 controls the pressure in first line 66 by connecting either first pressure source P0 or second pressure PR, a higher pressure, to first end 64 of piston 62 via FFV 68.

In the event of a power interruption, EHSV 12 is adapted to shift spool 16 to a failsafe position, to and against the upper end of spool sleeve 18 as illustrated in FIG. 4. In this position, second port P2 is open to first pressure P0 allowing higher, second pressure PR in third passage 92 to drive FFV 68 in the direction opposite arrow 86 or downwardly as viewed in FIG. 4. In the position illustrated in FIG. 4, FFV 68 seals a fixed volume of liquid in first passage 66 between first seal 63 of piston 62 and first and second seals 76, 80 of FFV 68 to lock piston 62 in place. In this configuration, only compressive forces, tending to move piston 62 upwardly in FIG. 3, are applied to piston 62. Therefore, it is only necessary to lock piston 62 against further upward movement in the event of a power interruption. Piston 62 is hydraulically locked against movement in a direction opposite arrow 86, and will resist small forces in that direction, but might move if a significant force is applied to the piston 62. A different system configuration, described below in connection with a third embodiment of the present invention, can be used when a piston must resist such bilateral loads.

During the transition from the position of FFV 68 in FIG. 3 to the position illustrated in FIG. 4, it will be appreciated that first passage 66 will briefly be exposed to second pressure PR as FFV 68 moves to block the first passage 66. This will result in a small movement of piston 62 from the position it occupied when the power interruption occurred. However, in the case of guide vanes such as the guide vanes attached to piston 62, this small movement can generally be tolerated. A dual diameter FFV such as the one described in connection with the first embodiment can be used if this small movement must be avoided.

Figure 5:
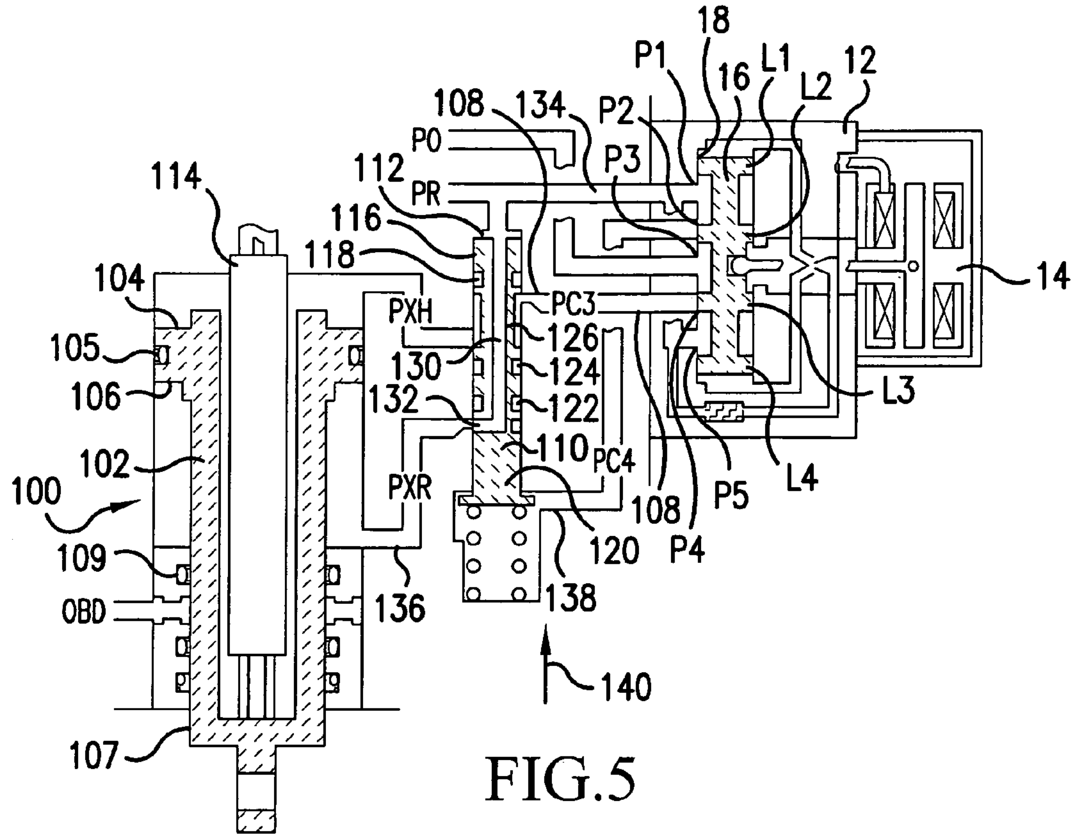
FIG. 5 schematically illustrates a third system for controlling the position of a piston that includes an FFV shown in an operating position.
Figure 6:
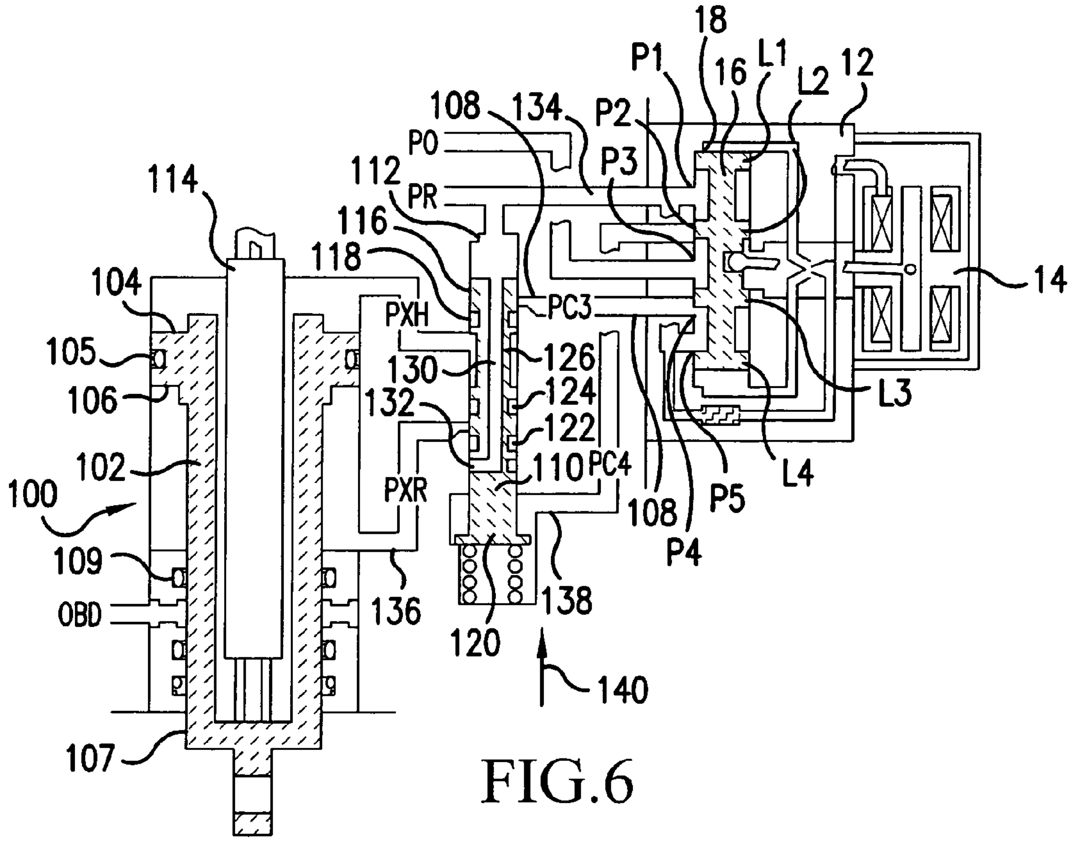
FIG. 6 schematically illustrates the system of FIG. 5 with the FFV in the fail fixed position.

A third embodiment of the invention is illustrated in FIGS. 5 and 6 wherein like reference numerals are used to identify elements comment to the earlier embodiments. In this embodiment, if a power interruption occurs, piston 102 must resist bilateral loads, that is, loads that may be applied either in the direction of arrow 140 or in a direction opposite the direction of arrow 140. In this configuration, a hydraulic lock as discussed in connection with the second embodiment cannot be relied upon to fix the piston in place. A significant force pulling against such a hydraulic lock could vaporize the fuel behind the piston and allow the piston to move.

Therefore, in the system 100 of the third embodiment, a piston 102 includes a first end 104 having a first diameter and a first end seal 105, and a second end 107 having a second diameter and a second end seal 109. In this embodiment, a first passage 108 connects fourth port P4 to first end 104 of piston 102 via an FFV 110 mounted in an FFV sleeve 112. An LVDT 114 provides feedback information concerning the position of piston 102 to a controller (not shown). FFV 110 includes a first end 116 having a first diameter and a first end seal 118, a second end 120 having a second diameter and first and second end seals 122, 124 and a central portion 126 having a third diameter less than the first and second diameters. A longitudinal passage 130 runs from first end 116 of FFV 110 to an exit opening 132 on a sidewall of second end portion 120. A second passage 134 connects first port P1 to first end 116 of FFV 110 and a source of fluid at second pressure PR. A third passage 136 connects FFV sleeve 112 to a central portion of piston 102 and annular surface 106. When FFV 110 is in the normal operating position illustrated in FIG. 5, longitudinal passage 130 connects second passage 134 to third passage 136 and thus exposes annular surface 106 to a pressure PXR derived from second pressure PR. A fourth passage 138 connects second port P2 of EHSV 12 to second end 120 of FFV 110.

In the event of a power interruption, spool 16 of EHSV 12 is adapted to shift spool 16 to a failsafe position, to and against the upper end of spool sleeve 18 as illustrated in FIG. 6. In this position, fourth passage 138 is opened to first pressure P0 which allows the higher pressure PR in second passage 134 to move FFV 110 opposite the direction of arrow 140, or down as viewed in FIGS. 5 and 6. This movement blocks first passage 108 and seals a fixed volume of fluid between first end seal 105 and the first end seal 118 and second end seal 124 of FFV 110. At the same time, the shifting of FFV 110 moves exit opening 132 out of alignment with third passage 136 and seals a fixed volume of fluid between first seal 105 and second seal 109 of piston 102 and first and second end seals 122, 124 of FFV 110 to hold piston 102 in place. Blocking both pressures helps to ensure that the bilateral forces exerted by the variable geometry guide vanes will always react against a trapped volume of incompressible fluid when in fail fixed mode.

The present invention has been described herein in terms of several embodiments. Obvious modifications and additions to these embodiments will become apparent to those skilled in the art upon a reading of the foregoing description. It is intended that all such obvious modifications and additions form a part of the present invention to the extent they fall within the scope of the several claims appended hereto.

What is claimed is:

1. A system comprising:

a controlled piston slidably mounted in a controlled piston sleeve and having a first end;

a spool movably mounted in a spool sleeve;

a first fluid passage from said spool to said controlled piston first end, the position of said spool affecting the fluid pressure applied to said controlled piston first end and a position of said controlled piston;

an FFV in an FFV sleeve in said first fluid passage having a first end section having a first diameter, a second end section having a second diameter and a central section having a third diameter less than said first and second diameters, said FFV being shiftable between a first position blocking said first fluid passage and a second position allowing fluid flow past said central section to said controlled piston; and a second fluid passage from said spool to said FFV first end section;

whereby shifting said spool to a failsafe position shifts said FFV to said FFV first position to seal a fixed volume of fluid between said FFV and said controlled piston first end.

2. The system of claim 1 wherein said second diameter is greater than said first diameter.

3. The system of claim 2 wherein said FFV sleeve has an FFV volume between said FFV first end section and said FFV second end section, said FFV volume when said FFV is in said first position being greater than said FFV volume when said FFV is in said second position.

4. The system of claim 1 wherein said spool comprises a second stage spool of an electrohydraulic servovalve.

5. The system of claim 1 including a spring biasing said FFV toward said second position.

6. The system of claim 1 wherein said controlled piston includes a second end and including a third fluid passage from said spool to said second end.

7. The system of claim 6 wherein said controlled piston includes an annular control surface spaced from said second end and including a fourth fluid passage from said second fluid passage to said annular control surface.

8. The system of claim 1 wherein said FFV includes a longitudinal bore connecting said FFV first end to an opening in a sidewall of said FFV second end section.

9. The system of claim 8 wherein said opening is blocked by said FFV sleeve when said FFV is in said first position.

10. The system of claim 1 including a fifth fluid passage from said spool to said FFV second end.

11. A system comprising:

a controlled piston slidably mounted in a controlled piston sleeve and having a first end and a second end;

an electrohydraulic servovalve having a second stage spool movably mounted in a spool sleeve;

a first fluid passage from said spool to said controlled piston first end, the fluid pressure in said first fluid passage affecting a position of said controlled piston;

an FFV in an FFV sleeve in said first fluid passage, said FFV having a first end section having a first diameter, a second end section having a second diameter greater than said first diameter and a central section having a third diameter less than said first and second diameters, said FFV being shiftable between a first position blocking said first fluid passage and a second position allowing fluid flow past said central portion to said controlled piston;

a second fluid passage from said spool to said FFV first end section;

a third fluid passage from said spool to said controlled piston second end; and a fourth fluid passage from said spool to said FFV second end.

12. The system of claim 11 including a spring biasing said FFV toward said second position.

13. The system of claim 11 wherein said controlled piston includes an annular control surface spaced from said second end and including a fifth fluid passage from said second fluid passage to said annular control surface.

14. The system of claim 11 wherein said FFV includes a longitudinal bore connecting said FFV first end to an opening in a sidewall of said FFV second end section.

15. The system of claim 11 wherein said opening is blocked by said FFV sleeve when said FFV is in said first position.

16. In a system comprising:

a controlled piston slidably mounted in a controlled piston sleeve and having a first end;

a spool movably mounted in a spool sleeve;

a first fluid passage from said spool to said controlled piston first end, an FFV in an FFV sleeve in said first fluid passage, said FFV having a first end section having a first diameter, a second end section having a second diameter and a central section having a third diameter less than said first and second diameters, a method comprising the steps of:

shifting said spool to control fluid flow in said first fluid passage to control the position of said controlled piston; and in the event of a power loss when said controlled piston is in a position, shifting said spool to a failsafe position, increasing a fluid flow in said first fluid passage to move said controlled piston from said position, and increasing a volume in said FFV sleeve to compensate for said increased fluid flow and return said controlled piston to said position; and blocking said first fluid passage to maintain said controlled piston in the position.

* * * * *